United States Patent
Palermo

(10) Patent No.: US 10,496,856 B2
(45) Date of Patent: Dec. 3, 2019

(54) CARD READER AND METHOD OF USE THEREOF

(71) Applicant: INTERNATIONAL TECHNOLOGIES & SYSTEMS CORPORATION, Cypress, CA (US)

(72) Inventor: Randy Palermo, Cypress, CA (US)

(73) Assignee: INTERNATIONAL TECHNOLOGIES & SYSTEMS, CORPORATION, Cypress, CA (US)

( * ) Notice: Subject to any disclaimer, the term of this patent is extended or adjusted under 35 U.S.C. 154(b) by 0 days.

(21) Appl. No.: 15/440,217

(22) Filed: Feb. 23, 2017

(65) Prior Publication Data

US 2018/0068138 A1 Mar. 8, 2018

Related U.S. Application Data

(60) Provisional application No. 62/384,690, filed on Sep. 7, 2016.

(51) Int. Cl.
| | |
|---|---|
| *G06K 7/00* | (2006.01) |
| *G06K 7/08* | (2006.01) |
| *G07F 7/08* | (2006.01) |
| *G06K 19/077* | (2006.01) |

(52) U.S. Cl.
CPC ........... *G06K 7/0069* (2013.01); *G06K 7/084* (2013.01); *G06K 19/07733* (2013.01); *G07F 7/0886* (2013.01)

(58) Field of Classification Search
CPC .............. G06Q 20/341; G06Q 20/352; G06K 19/0723; G06K 19/07
USPC ........................................................ 235/451
See application file for complete search history.

(56) References Cited

U.S. PATENT DOCUMENTS 7,357,309 B2 * 4/2008 Ghosh .................. G06Q 20/045
235/380

\* cited by examiner

*Primary Examiner* — Jamara Franklin
(74) *Attorney, Agent, or Firm* — Benjamin Balser; Next IP Law Group

(57) ABSTRACT

A representative card reader that communicates with a host device comprises an EMV chip interfacing circuit that facilitates transmitting and receiving data to and from a Europay, Mastercard, and Visa (EMV) chipcard; and a computing device that is electrically coupled to the EMV chip interfacing circuit. The computing device receives and processes the received data from the EMV chip interfacing circuit, and transmits processed data to the EMV chipcard via the EMV chip interfacing circuit. The card reader further comprises a uni-directional interfacing circuit that establishes communications between the computing device and a host device without the need for specialized software drivers, with the simplicity for capturing the card data in a native OS system of the host device for transfer to a financial payment application, and applicable for both browser based or application based software on the host device. The uni-direction interfacing circuit communicates with the host device to transmit electrical signals associated with the processed data from the computing device.

20 Claims, 4 Drawing Sheets

CARD READER AND METHOD OF USE THEREOF

CROSS REFERENCE TO RELATED APPLICATIONS

This application claims the benefit of U.S. provisional application entitled, "CARD READER AND METHOD OF USE THEREOF," having Ser. No. 62/384,690, filed on Sep. 7, 2016, which is entirely incorporated herein by reference.

TECHNICAL FIELD

The present disclosure is generally related to card readers.

BACKGROUND

With the subsequent emergence of Europay, Mastercard, and Visa (EMV) ChipCards (aka SmartCards), communications between a chip card (and card reader) and a payment system are bi-directional so that multiple data can be exchanged between them for processing financial transactions with the EMV chip cards. As a result, uni-directional interfaces such as USB-Keyboard are currently not used with EMV ChipCards. This resulted in the need for card readers that featured a bi-directional interface such as a Human Interface Device (e.g., USB-HID). USB-HID interfaces are more complex than Keyboard interfaces, and use specialized software (drivers) to access the data, and embed it into browser or native payment applications. In particular, this additional complexity of bi-directional communications and software drivers made connectivity to browser based payment applications more difficult, as an installation of a custom software driver into the PC is typically a pre-requisite to connecting to the payment application. Whereas, peripherals having the uni-direction interface systems can be used more readily without such drivers and complexity as peripherals having USB-HID interface systems.

As EMV cards started to be used, there were complaints that the EMV Chip Card systems were "slow" to complete a financial transaction mainly because the EMV chip cards were kept in the card reader for approximately 10 seconds before the card reader instructs the user to remove the card. The EMV Chip Card system is perceived as "slow" as compared to magnetic stripe transactions where the user could simply "swipe" the card, and then immediately put the card back in to their wallet. To combat this perception, the card brands (Visa, MasterCard, etc.) have created and approved a special EMV transaction sequence known as "Quick Chip" or "Fast EMV" (hereinafter referred to as Quick Chip). Quick Chip uses the same EMV chip cards that are already deployed, but speeds the payment authorization process by providing the card with pre-configured data and immediate feedback to close the transaction without waiting for a response from the back end systems. Despite the advantages of Quick Chip Card system, EMV card readers are currently designed to use a bi-directional interface from the payment application to the Host device, such as a USB-HID interface, with the difficulties and complexities mentioned above.

Desirable in the art is an improved card reader that would improve upon the conventional card readers that processes EMV chip cards.

SUMMARY

A representative card reader that communicates with a host device comprises an EMV chip interfacing circuit that facilitates transmitting and receiving data to and from a Europay, Mastercard, and Visa (EMV) chipcard; and a computing device that is electrically coupled to the EMV chip interfacing circuit. The computing device receives and processes the received data from the EMV chip interfacing circuit, and transmits processed data to the EMV chipcard via the EMV chip interfacing circuit. The card reader further comprises a uni-directional interfacing circuit that establishes communications between the computing device and a host device without the need for specialized software drivers, with the simplicity for capturing the card data in a native OS system of the host device for transfer to a financial payment application, and applicable for both browser based or application based software on the host device. The uni-direction interfacing circuit communicates with the host device to transmit electrical signals associated with the processed data from the computing device.

BRIEF DESCRIPTION OF THE DRAWINGS

The accompanying drawings illustrate preferred embodiments of the invention, as well as other information pertinent to the disclosure, in which.

DETAILED DESCRIPTION

Exemplary systems are first discussed with reference to the figures. Although these systems are described in detail, they are provided for purposes of illustration only and various modifications are feasible. Also, examples of flow diagrams of the systems are provided to explain the manner in which communication is established and data is communicated between a card reader for EMV chip card transactions and a host device using a uni-directional interface systems, such as a traditional Keyboard (USB-Keyboard) interface systems. This disclosure recognizes that Quick Chip simplifies the data exchange process to a single event uni-directional transaction; hence, enabling the card readers having EMV card capabilities to be designed and operated using the uni-directional interface systems with a payment system.

EMV adoption has proven challenging for merchants (especially small to midsize businesses), and in the U.S., many consumers have found chip-card transactions to be slow and inconvenient. Quick Chip technology (pioneered by Visa, but embraced, also, by other leading card brands) brings EMV transaction times down to around two seconds, but until now, virtual terminals have not been able to leverage this technology, for technical reasons. This disclosure brings together Quick Chip technology, USB keyboard mode, and a proven EMV L2 kernel. The disclosure makes it easy for virtual terminal customers to benefit from two-second transaction times while minimizing PCI-DSS scope.

Figure 1:
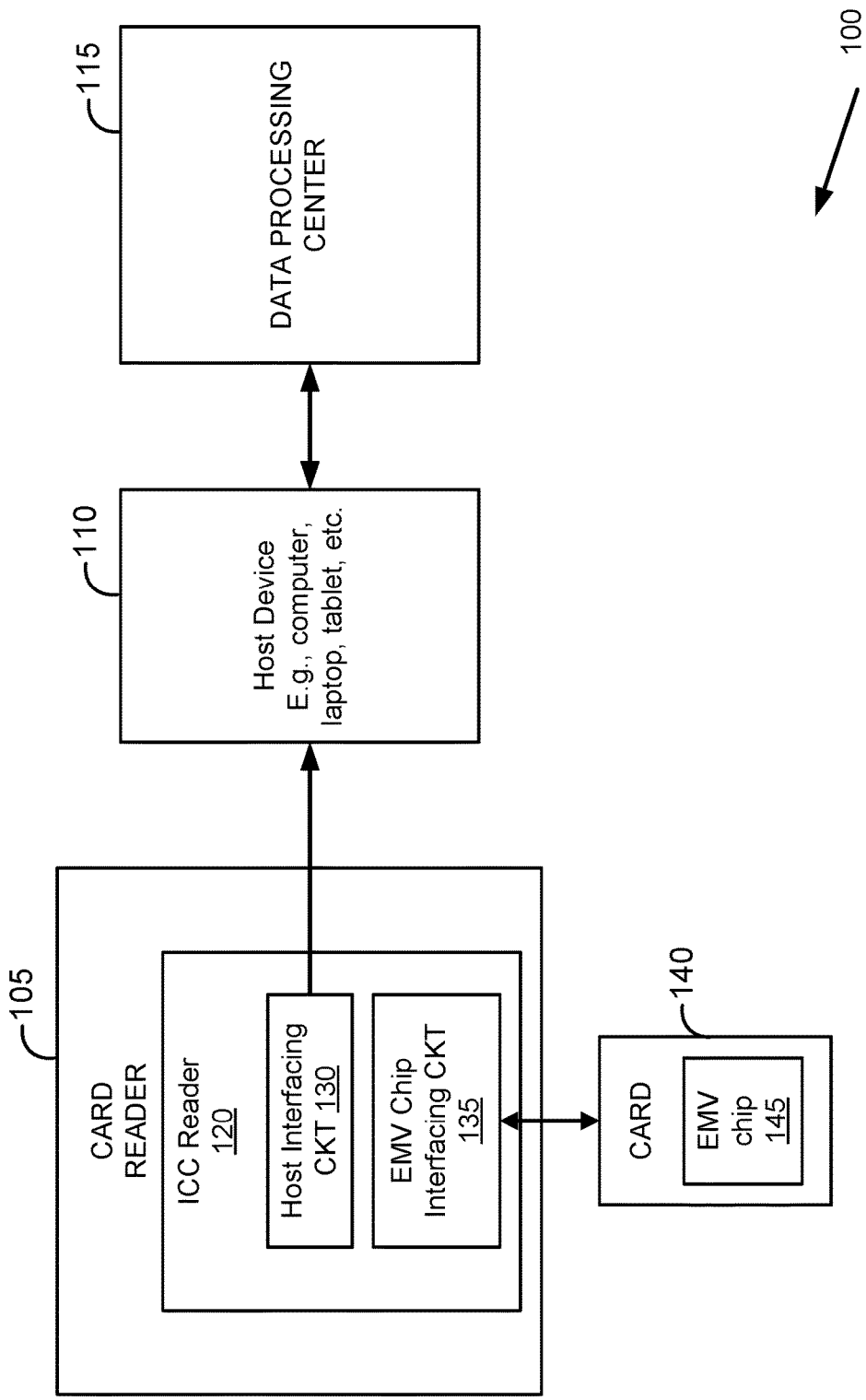
FIG. 1 is a block diagram that illustrates an embodiment of a card processing system having an Integrated Circuit Card (ICC) Reader with an EMV chip interfacing circuit that interfaces to the EMV Card bi-directionally and with an Host interfacing circuit that interfaces to a host device uni-directionally.

FIG. 1 is a block diagram that illustrates an embodiment of a card processing system 100 having an Integrated Circuit Card (ICC) Reader 120 with a Host interfacing circuit 130 that interfaces and facilitates communication with a host device 110. In general, the card processing system 100 receives data from a card reader 105 that includes the ICC Reader 120, which receives data from a financial card 140 and transmits the received data to the host device 110. Such device 110 communicates with a data processing center 115 to process the received data and complete a credit card transaction.

The card reader 105 identifies card data in the following ways, among others: 1) a card 140 having a magnetic stripe is swiped through a magnetic read head slot (not shown) in the card reader 105, 2) the card 140 with near field communications (NFC) technology is held next to the card reader 105, and 3) the card 140 having an EMV chip 145 is put into an EMV slot (not shown) of the card reader 105 where the EMV chip card is inserted there into. The card reader 105 is configured to identify the card data based on universal specifications and formats that apply to financial transaction cards. The card reader 105 can be a microcontroller based device that can communicate with a magnetic read head (not shown) to read the tracks on the magnetic stripe cards simultaneously, a Near Field read head (not shown) to read electromagnetic signals from a financial transaction card with Near Field Communication (NFC) capabilities, or a NFC-enabled device or a contactless reader, and/or the ICC Reader 120 which communicates with an EMV chip (e.g., Quick Chip).

The card reader 105 includes a Host interfacing circuit 130 that facilitates the card reader 105 to establish communication between the card reader 105 and the host device 110 using a communication cable, such as universal serial bus (USB) connectors and mini-USB connectors. The host device 110 includes, but is not limited to, a personal computer, laptop, tablet, iPad, and smart phone, among other portable devices having a processor (not shown). The host device 110 sends data to the data processing center 115, such as a credit card processor.

In a Quick Chip transaction, the chip card 140 advises the host device 110 to go online within roughly two seconds of card presentation, and the customer is free to remove his/her card immediately, at that point. The host device 110 can go online with an approval request while the customer is putting his or her card away. When the online decision comes, that decision is then binding, and a receipt can be printed.

Despite the advantages of Quick Chip Card system, EMV card readers are currently designed to use USB-HID interface systems with the difficulties and complexities mentioned in the background section. Quick Chip simplifies the data exchange process to a single event uni-directional transaction, and this disclosure recognizes that EMV card readers can be connected to Personal Computer-Point of Sale (PC-POS) systems via a uni-directional interface such as that shown in FIG. 2 having a Keyboard interface. (e.g., USB-Keyboard), eliminating the difficulties and complexities of the USB-HID interface systems mentioned above.

Figure 2:
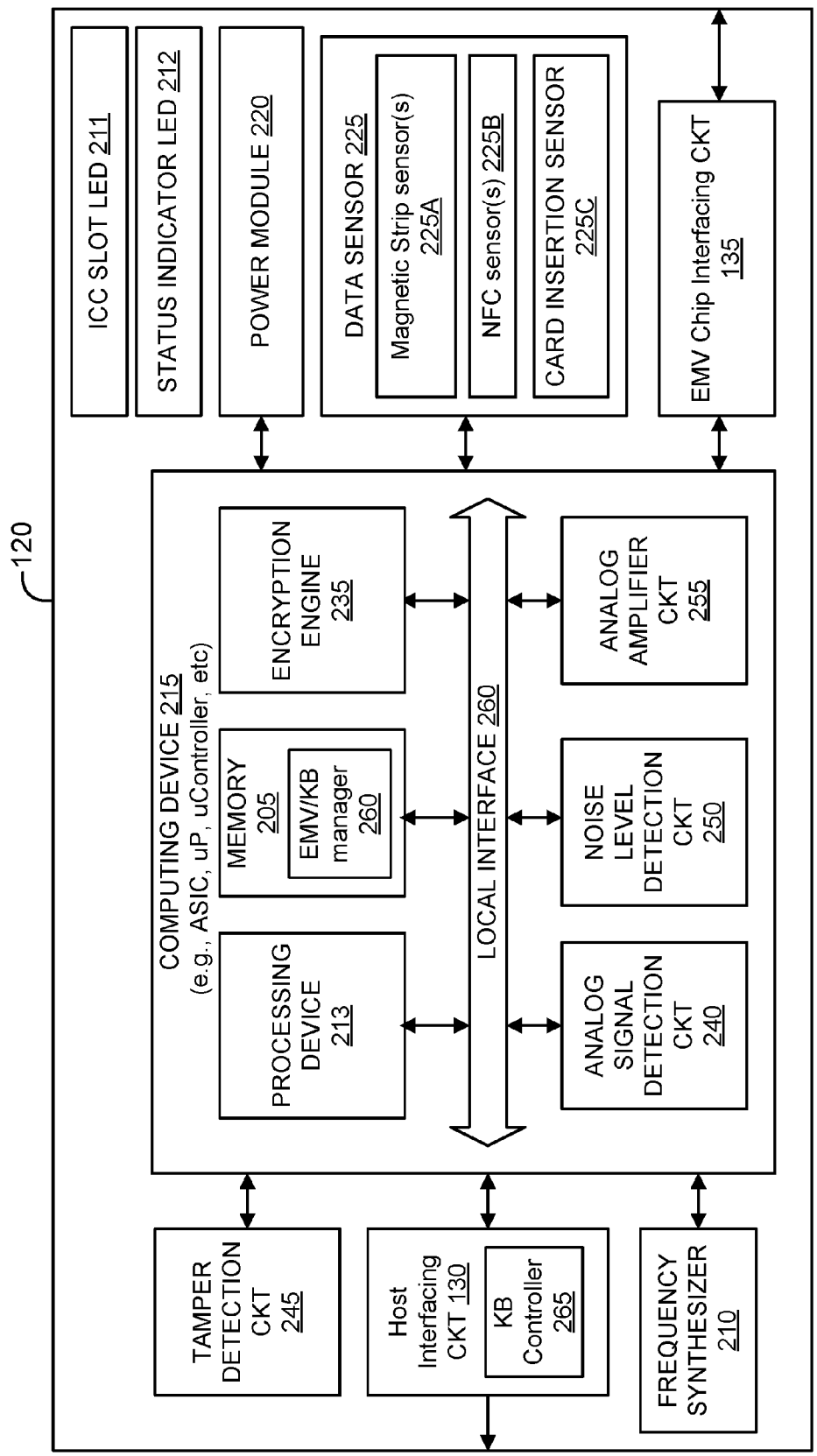
FIG. 2 is a more detailed block diagram that illustrates an embodiment of a ICC Reader having a host interfacing circuit and an EMV chip interfacing circuit, such as that shown in FIG. 1.

FIG. 2 is a more detailed block diagram that illustrates an embodiment of the ICC Reader 120 having the Host interfacing circuit 130 with a keyboard controller, such as that shown in FIG. 1. The Host interfacing circuit 130 includes a keyboard controller 265 that interfaces the ICC Reader 120 to the host device 110. It should be noted that a USB controller or other peripheral controller can be used so long as it can handle keyboard functions and configurations.

In an installation of the ICC Reader 120, a connector (not shown, e.g., USB male) of the Host interfacing circuit 130 can be inserted into a host device 110 (e.g., a PC) via a USB female connector, for example. The host device 110 establishes uni-directional communications with the ICC Reader 120 via a keyboard controller 265 without installing specialized software (drivers) to access the data and without embedding the specialized software into browser or native payment applications at the host device 110, such as that related to USB-HID interfaces. From a card data perspective, once the EMV card data is captured by the ICC Reader 120 there should be no further need to communicate with the EMV chip 145 on the card 140 or the ICC Reader 120 (FIG. 1) by the host device 110. The PC-Keyboard enables the card reader 105 (FIG. 1) to be connected to the host device 110 without the need for specialized software drivers, with the simplicity for capturing the card data in a native OS system for transfer to the payment application, and applicable for both browser based or application based software on the host PC.

The use of USB in HID mode is problematic not just because specialized software drivers (with host-specific installation requirements) are needed, but because browser- or web-based virtual terminal software cannot connect to a USB port directly; the browser is not USB-aware, and applications written in HTML cannot connect to a device on a serial port. Hence, there is no easy way to get data from a USB-HID device to show up in a browser window or web form, regardless of which drivers are installed. This disclosure discloses card readers 105 that operate in USB Keyboard mode and can send data (as "keystrokes") directly to a web form. This makes it easy to connect USB-KB card readers 105 to virtual terminal apps.

The ICC Reader 120 includes a computing device 215, such as, an ASIC, microprocessor, and micro-controller, among others. The computing device 215 includes a processing device 213 that is electrically coupled to the Host interfacing circuit 130 and communicates with the host device 110 via the interfacing circuit 130. The ICC Reader 120 can include other electrical components that can facilitate communicating, sensing and securing the data to and from the card 140, among others. The electrical components can include, but are not limited to, memory 205, frequency synthesizer 210, power module 220, data sensor(s) 225 (e.g., magnetic and/or NFC sensors 225A, 225B), encryption engine 235, analog signal detection circuit 240, tamper detection circuit 245, noise level detection circuit 250, and analog amplifier circuit 255, some of which are described in U.S. Pat. No. 8,925,817 entitled, "Card Reader and Method of Use Thereof," filed on Nov. 4, 2012, that is incorporated herein by reference. The computing device 215 can be an integrated circuit that is designed and made utilizing wafer technology to ensure minimum power consumption, a single IC design, and minimum silicon which can be accomplished in approximately 0.18 micron silicon.

The ICC reader 120 can include an ICC slot light/LED 211 that flashes light responsive to the card 140 being inserted in a card slot (not shown) of the ICC reader 120, the status indicator light/LED 212 that turns on, e.g., "green" light to show that the ICC reader 120 is being used and "blue" light to show that the ICC reader 120 is ready to be used, and a card insertion sensor 225C that detects when the card 140 is inserted into the card slot.

An EMV chip interfacing circuit 135 enables the computing device 215 to communicate with the EMV chip 145 of the financial card 140. In general, the computing device 215 receives and transmits data to/from the EMV chip 145 during a financial EMV transaction. In one example, among others, the card reader 105 can be configured with certain terminal settings, such as Visa application identifier (AID), certificate authority public key (CAPK), and certificate revocation list (CRL), to operate in a uni-directional interfacing mode. Alternatively or additionally, the card reader 105 can be configured to process financial transaction online only, such as Terminal Type 21, and having no cardholder verification method (CVM), and no cardholder confirmation. The configuration of the card reader 105 can include a setting for specifying a type of data (e.g, tag value) that identifies QuickChip processing. The card reader 105 should not contain any AID files matching non-QuickChip applications.

Alternatively or additionally, the output of the card reader 105 can be in strict Basic Encoding Rules-Type/Length/Value (BER-TLV) having an ASCII representation of the binary data in Hex format. This can be accomplished as follows:

1. There cannot be any instances of a tag value with both unencrypted and encrypted results. The results can be either/or so, for example, when there is encrypted data, it should not be flagged with a TLV Length Encryption Flag.
2. Any masked data (in particular PAN 5A) should be assigned a unique tag value.
3. The BER-TLV values include data related to the chip card 140, the host device 110, AID file, card reader custom tags, and tags generated by the EMV kernel (not shown).
4. The card reader custom tags can include default amount to use when executing a transaction, listing of BER-TLV tags to return upon successful transaction, and allow MSR swipe from ICC card (or do not enforce ICC chip to be read first).

Figure 3:
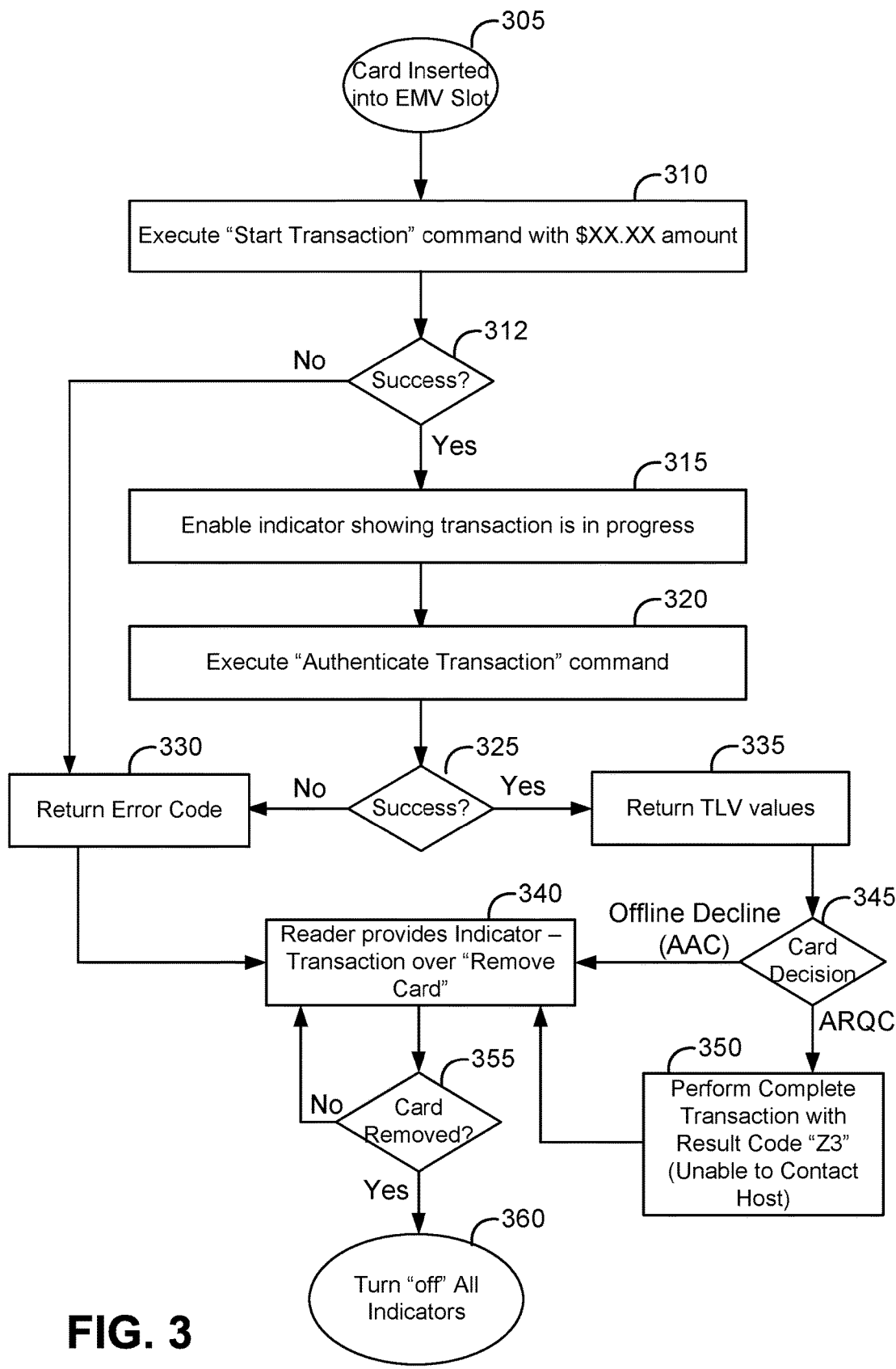
FIG. 3 illustrates an embodiment of a flow diagram that shows the processing of a financial card using bi-directional communication between the EMV Card and an ICC Reader and uni-directional communication from the ICC Reader to the host device, such as that shown in FIG. 1.

FIG. 3 illustrates an embodiment of a flow diagram that shows the processing of a financial card 140 at the card reader 105, such as that shown in FIG. 1, after the card reader 105 and the host device 110 have been configured for uni-directional interfacing mode (e.g, KB mode). It should be noted that a bi-directional communication is established between the card reader 105 and the financial card 140 during the processing of the financial card 140, which is shown and described in more details as follows. Responsive to the EMV chip 145 not being sensed by the card insertion sensor 225C, the ICC slot led 211 is off, the Status LED Indicator 212 is off, and frequency synthesizer 210 is silent. Beginning with step 305, the financial card 140 having an EMV chip 145 (FIG. 1) is inserted into an EMV slot (not shown in ICC reader 120) of a card reader 105 (FIG. 1) to initiate a financial EMV transaction. In step 310, the computing device 215 executes a "Start Transaction" command in any amount of money, e.g., $0.00 or $50.00, and communicates with the EMV chip 145. In step 312, the computing device 215 determines whether initiating a financial EMV transaction with the EMV chip 145 is successful.

Responsive to determining that the financial EMV transaction cannot be initiated, the computing device 215 returns an error code to the host device 110, such as that shown in step 314, which indicates the termination of the transaction. Responsive to determining that the financial EMV transaction can be initiated, the computing device 215 powers on an indicator (not shown) at the card reader 105 to show that a financial transaction is in progress, such as that shown in step 315. In step 320, the computing device 215 executes an authentication process of the financial EMV transaction with the EMV chip 145.

In step 325, the computing device 215 determines whether the initiating of the authentication process with the EMV chip 145 is successful. Responsive to determining that the authentication process cannot be initiated, the computing device 215 returns an error code to the host device 110, such as that shown in step 330, which indicates the termination of the transaction and the computing device 215 will then perform step 340. Responsive to determining that authentication process can be initiated, the computing device 215 returns TLV values to the host device 110 over the USB-Keyboard interface 130, such as that shown in step 335. For example, the computing device 215 receives financial transaction data that are associated with tag values, which tags to be included in the output can be specified in a terminal configuration file, and output those tag values as an ASCII-HEX string over the KB interface 130. If the terminal configuration file does not contain the data to specify which tags to include in the final output, a standard default set of EMV tags can be transmitted to the host device 110.

In step 345, the computing device 215 determines whether a card decision is reached with the EMV chip 145 to perform an online authorization cryptogram (ARQC). Responsive to receiving a decision to perform the online authorization cryptogram from the EMV chip 145, the computing device 215 performs step 350 to finalize the transaction. The other possible card decision is an Offline Decline (AAC), which indicates the completion of the transaction and the computing device 215 can then perform step 340.

In step 350, the computing device 215 completes the financial EMV transaction by performing a Complete Transaction with a result code "Z3" (Unable to Contact Host) which indicates the completion of the transaction and the computing device 215 can then perform step 340. In step 340, the card reader 105 indicates transaction is complete until the financial card 140 is removed from the EMV slot. If at any point after a successful Start Transaction was executed, an error is encountered, the transaction terminates, the card reader 105 outputs an error code over the KB interface 130 to the host device 110 indicating the transaction is terminated and the computing device 215 can then perform step 340.

In step 355, the computing device 215 determines whether the financial card 140 is removed from the EMV slot. If the financial card 140 is not removed from the EMV slot, the computer device 215 repeats step 340. If the financial card 140 is removed from the EMV slot, the computing device 215 turns off any transaction in-progress or card removal indicator(s), such as that shown in step 360.

Figure 4:
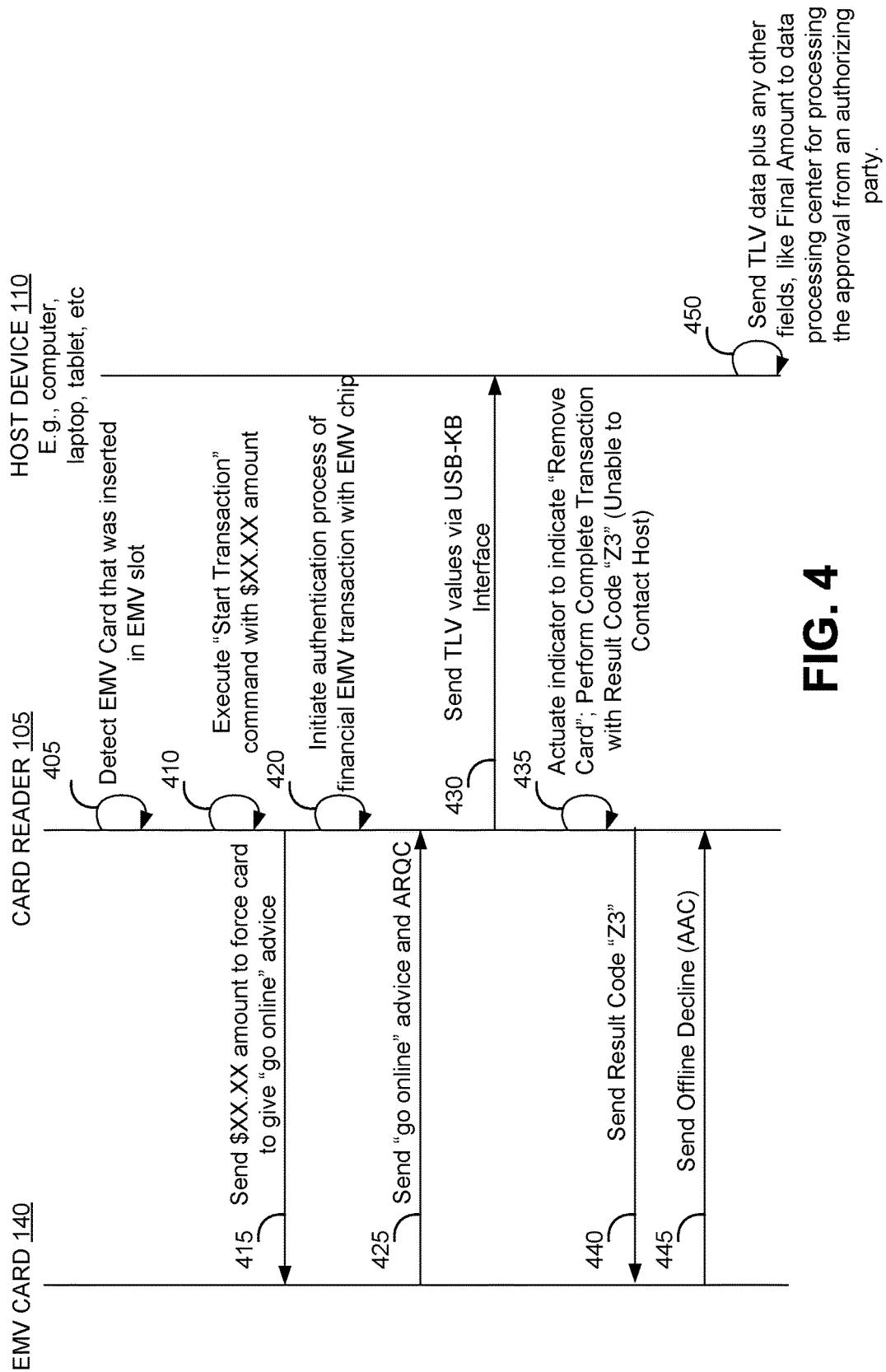
FIG. 4 is a sequence diagram that illustrates an embodiment of a card processing system, such as that shown in FIG. 1.

FIG. 4 is a sequence diagram that illustrates an embodiment of a card processing system 100, such as that shown in FIG. 1. Beginning with line 405, in a Quick Chip mode the card reader 105 is preconfigured to detect the insertion of a chip card 140 in a card reader slot (not shown). At lines 410 and 415, if the card is inserted correctly, the card reader 105 executes a "Start Transaction" command with an arbitrary initial transaction amount and send the arbitrary initial transaction amount to the chip car 140 to force the card to give "go online" advice. At line 420, the card reader 105 initiates an authentication process of financial EMV transaction with the chip card 140. At line 425, the chip card 140 sends the "go online advice and an online authorization cryptogram (ARQC) to the card reader 105.

At line 430, the card reader 105 sends Type/Length/Value (TLV) values to a host device 110 (FIG. 1) using a uni-directional interface system, such as the USB-keyboard interface. At line 435, the card reader 105 actuates indicators to indicate to the user to "Remove Card". For example, an ICC-slot-light 211 (FIG. 2) of the card reader 105 begins to flash, and the unit beeps audibly (not shown) until the chip card 140 is removed from the ICC slot (not shown). When the chip card 140 is removed, the slot-light 211 stops flashing, and the status indicator light 212 returns to blue. The card reader 105 performs a complete transaction with an ARC (result code) of 'Z3'—Unable to Contact Host. At line 440, the card reader 105 sends the result code of 'Z3' to the chip card 140.

At line 445, the chip card 140 receives the Z3 result code and issues an AAC (Offline Decline), which indicates an Declined transaction. But in Quick Chip mode, the chip card's decision is not the final decision. It should be noted that because the transaction sequence can be initiated without the Final Amount yet known (it's provided, by the terminal, at the end of the sequence), the chip card 140 doesn't have to remain inserted in the card reader 105 while the Final Amount is being tallied. Thus, the card-inserted time is reduced. At line 433, the host device 110 sends the TLV values plus any other fields, e.g., Final Amount, to a data processing center 115 for processing the approval of the financial EMV transaction from an authorizing party. When the online authorization decision is relayed back to the host device 110, that decision is the final decision, and any necessary customer receipts can be printed at that time.

As described herein, an improved card reader and/or ICC reader are presented utilizing an interfacing circuit to facilitate communication between the ICC reader having EMV chip processing technology and the host device using uni-directional interface systems, such as the keyboard interface. This approach allows the card reader to be connected to a host device without the need for specialized software drivers, with the simplicity for capturing the card data in a native OS system for transfer to the payment application, and applicable for both browser based or application based software on the host PC.

Although the invention has been described in terms of exemplary embodiments, it is not limited thereto. Rather, the appended claims should be construed broadly to include other variants and embodiments of the invention that may be made by those skilled in the art without departing from the scope and range of equivalents of the invention.

What is claimed is:

1. A card reader that communicates with a host device, the card reader comprising:
    a Europay, Mastercard, and Visa (EMV) chip interfacing circuit that facilitates transmitting and receiving data to and from an EMV chipcard;
    a computing device that is electrically coupled to the EMV chip interfacing circuit, wherein the computing device receives and processes the received data from the EMV chip interfacing circuit, and transmits processed data to the EMV chipcard via the EMV chip interfacing circuit; and
    a uni-directional interfacing circuit that establishes uni-directional communications between the computing device and a host device, capturing the card data in a native OS system of the host device for transfer to a financial payment application, and applicable for both browser based or application based software on the host device, wherein the uni-direction interfacing circuit communicates with the host device to transmit electrical signals associated with the processed data from the computing device.

2. The card reader as defined in claim 1, wherein the uni-directional interfacing circuit includes a USB-Keyboard interface.

3. The card reader as defined in claim 2, wherein the card reader operates in USB Keyboard mode and sends data (as "keystrokes") directly to a web form via the USB-Keyboard interface.

4. The card reader as defined in claim 3, wherein the card reader is configured with certain terminal settings, such as Visa application identifier (AID), certificate authority public key (CAPK), and certificate revocation list (CRL), to operate in the USB Keyboard mode.

5. The card reader as defined in claim 1, wherein the card reader is configured to process financial transaction online only, such as Terminal Type 21, and having no cardholder verification method (CVM), and no cardholder confirmation.

6. The card reader as defined in claim 1, wherein the card reader is configured to identify card data based on universal specifications and formats that apply to financial transaction cards.

7. The card reader as defined in claim 1, wherein the computing device includes a micro-controller based device that communicates with a magnetic read head to read the tracks on the magnetic stripe cards simultaneously, a Near Field read head to read electromagnetic signals from a financial transaction card with Near Field Communication (NFC) capabilities, or a NFC-enabled device or a contactless reader, or an integrated circuit card reader that communicates with the EMV chipcard.

8. The card reader as defined in claim 1, wherein the host device includes a personal computer, a laptop, tablet, iPad, and smart phone, among other portable devices having a processor.

9. The card reader as defined in claim 1, wherein the host device includes keyboard controller, USB controller or other peripheral controller that handles keyboard functions and configurations.

10. The card reader as defined in claim 1, wherein the card reader outputs in strict Basic Encoding Rules-Type/Length/Value (BER-TLV) having an ASCII representation of binary data in Hex format.

11. A method for establishing communication between an EMV card reader and a host device, the steps comprising:
    receiving and processing data from a Europay, Mastercard, and Visa (EMV) chipcard;
    transmiting the processed data to the EMV chipcard;
    establishing uni-directional communications between an EMV card reader and a host device, capturing the card data in a native OS system of the host device for transfer to a financial payment application, and applicable for both browser based or application based software on the host device.

12. The method as defined in claim 11, wherein the uni-directional communications between an EMV card reader and a host device include a USB-Keyboard interface.

13. The method as defined in claim 11, further comprising operating the EMV card reader in USB Keyboard mode and sending data (as "keystrokes") directly to a web form via the USB-Keyboard interface.

14. The method as defined in claim 13, further comprising configuring the EMV card reader with certain terminal settings, such as Visa application identifier (AID), certificate authority public key (CAPK), and certificate revocation list (CRL), to operate in the USB Keyboard mode.

15. The method as defined in claim 11, further comprising configuring the EMV card reader to process financial transaction online only, such as Terminal Type 21, and having no cardholder verification method (CVM), and no cardholder confirmation.

16. The method as defined in claim 11, further comprising configuring the EMV card reader to identify card data based on universal specifications and formats that apply to financial transaction cards.

17. The method as defined in claim 11, further comprising outputting from the EMV card reader a format in strict Basic Encoding Rules-Type/Length/Value (BER-TLV) having an ASCII representation of binary data in Hex format.

18. A financial transaction system that processes Europay, Mastercard, and Visa (EMV) cards and communicates with a host device using uni-directional communications, the system comprising:
   a host device that processes financial transaction with a data processing center; and
   an EMV card reader comprising:
      an EMV chip interfacing circuit that facilitates transmitting and receiving data to and from a chipcard;
      a computing device that is electrically coupled to the EMV chip interfacing circuit, wherein the computing device receives and processes the received data from the EMV chip interfacing circuit, and transmits processed data to the EMV chipcard via the EMV chip interfacing circuit; and
      a uni-directional interfacing circuit that establishes uni-directional communications between the computing device and the host device, capturing the card data in a native OS system of the host device for transfer to a financial payment application, and applicable for both browser based or application based software on the host device, wherein the uni-direction interfacing circuit communicates with the host device to transmit electrical signals associated with the processed data from the computing device.

19. The system as defined in claim 18, wherein the uni-directional interfacing circuit includes a USB-Keyboard interface.

20. The system as defined in claim 19, wherein the EMV card reader operates in USB Keyboard mode and sends data (as "keystrokes") directly to a web form via the USB-Keyboard interface.

* * * * *